US012505651B2

(12) United States Patent
Kurata et al.

(10) Patent No.: US 12,505,651 B2
(45) Date of Patent: Dec. 23, 2025

(54) IMAGE IDENTIFICATION SYSTEM AND IMAGE IDENTIFICATION METHOD FOR IDENTIFYING IMAGES BASED ON DIVIDED TRAINING IMAGES (71) Applicant: Hitachi, Ltd., Tokyo (JP)

(72) Inventors: Sayaka Kurata, Tokyo (JP); Hailin Wang, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 559 days.

(21) Appl. No.: 17/863,759

(22) Filed: Jul. 13, 2022

(65) Prior Publication Data
US 2023/0034382 A1 Feb. 2, 2023

(30) Foreign Application Priority Data

Jul. 29, 2021 (JP) ................................. 2021-123914

(51) Int. Cl.
G06V 10/774 (2022.01)
G06V 10/54 (2022.01)
G06V 10/70 (2022.01)
G06V 10/776 (2022.01)
G06V 20/69 (2022.01)

(52) U.S. Cl.
CPC ............ G06V 10/774 (2022.01); G06V 10/54 (2022.01); G06V 10/776 (2022.01); G06V 10/87 (2022.01); G06V 20/698 (2022.01)

(58) Field of Classification Search
None
See application file for complete search history.

(56) References Cited

U.S. PATENT DOCUMENTS

2015/0310632 A1* 10/2015 Banerjee .................. G06T 7/45
382/131
2021/0366594 A1* 11/2021 Park ........................ G16H 10/40
2022/0319219 A1* 10/2022 Tsibulevskiy ........... G06F 18/40

FOREIGN PATENT DOCUMENTS

JP        2017117019 A   *  6/2017
JP        2020-160543 A     10/2020

OTHER PUBLICATIONS

Zhou, J. et al., "The Effect of GLBM parameters on LAI estimation using texture values from Quickbird Satellite Imagery", Scientific Reports, dated Aug. 4, 2017 (12 pages).

* cited by examiner

Primary Examiner — Vincent Rudolph
Assistant Examiner — Meredith Taylor
(74) Attorney, Agent, or Firm — Crowell & Moring LLP

(57) ABSTRACT

An image identification system includes: an image dividing unit which divides training images of a first training data set and assigns a label assigned to a training image from which dividing occurs to the divided training images as tentative labels; a texture index computing unit which computes texture indexes for each of the divided training images; a tentative label prediction model building unit which builds a tentative label prediction model to predict tentative labels assigned to the divided training images based on the texture indexes; and a label comparison unit which compares first tentative labels assigned to the divided training images with second tentative labels predicted with respect to the divided training images by the tentative label prediction model and extracts divided training images for which there is discrepancy between the first and second tentative labels as those images for which it is necessary to modify tentative labels.

13 Claims, 12 Drawing Sheets

| IMAGE ID | #1 | #2 | #3 | #4 |
|---|---|---|---|---|
| TRAINING IMAGE |  |  |  |  |
| LABEL | A | B | C | C |

FIG. 3B

| IMAGE ID | #1-1 | #1-2 | #2-1 | #2-2 | #3-1 | #3-2 | #4-1 | #4-2 |
| | #1-3 | #1-4 | #2-3 | #2-4 | #3-3 | #3-4 | #4-3 | #4-4 |
| TRAINING IMAGE |  | |  | |  | |  | |
| TENTATIVE LABEL | A | A | B | B | C | C | C | C |
| | A | A | B | B | C | C | C | C |

FIG. 3C

| IMAGE ID | #1-1 | #1-2 | #2-1 | #2-2 | #3-1 | #3-2 | #4-1 | #4-2 |
|---|---|---|---|---|---|---|---|---|
|  | #1-3 | #1-4 | #2-3 | #2-4 | #3-3 | #3-4 | #4-3 | #4-4 |
| TRAINING IMAGE | | | | | | | | |
| TENTATIVE LABEL | A | A | B | – | C | C | C | – |
|  | A | A | B | B | C | C | – | C |

FIG. 3D

| IMAGE ID | #1-1 | #1-2 | #2-1 | #2-2 | #3-1 | #3-2 | #4-1 | #4-2 |
|---|---|---|---|---|---|---|---|---|
|  | #1-3 | #1-4 | #2-3 | #2-4 | #3-3 | #3-4 | #4-3 | #4-4 |
| TRAINING IMAGE | | | | | | | | |
| MODIFIED LABEL | A | A | B | D | C | C | C | A |
|  | A | A | B | B | C | C | B | C |

FIRST TRAINING DATA SET

| IMAGE ID | FILE NAME | LABEL |
|---|---|---|
| #1 | image_a | A |
| #2 | image_b | B |
| #3 | image_c | C |
| #4 | Image_d | C |

FIG. 9B

SECOND TRAINING DATA SET

| IMAGE ID | FILE NAME | IMAGE ID FROM WHICH DIVIDING OCCURS | DIVISION NUMBER X | DIVISION NUMBER Y | TENTATIVE LABEL | LABELS PREDICTED BY TEXTURE INDEXES | X/Y IMAGE GROUP | MODIFIED LABEL |
|---|---|---|---|---|---|---|---|---|
| #1-1 | image_a_1 | #1 | 2 | 2 | A | A | X | A |
| #1-2 | image_a_2 | #1 | 2 | 2 | A | A | X | A |
| #1-3 | image_a_3 | #1 | 2 | 2 | A | A | X | A |
| #1-4 | image_a_4 | #1 | 2 | 2 | A | A | X | A |
| #2-1 | image_b_1 | #2 | 2 | 2 | B | B | X | B |
| #2-2 | image_b_2 | #2 | 2 | 2 | B | D | Y | D |
| #2-3 | image_b_3 | #2 | 2 | 2 | B | B | X | B |
| #2-4 | image_b_4 | #2 | 2 | 2 | B | B | X | B |
| #3-1 | image_c_1 | #3 | 2 | 2 | C | C | X | C |
| #3-2 | image_c_2 | #3 | 2 | 2 | C | C | X | C |
| #3-3 | image_c_3 | #3 | 2 | 2 | C | C | X | C |
| #3-4 | image_c_4 | #3 | 2 | 2 | C | C | X | C |
| #4-1 | image_d_1 | #4 | 2 | 2 | C | C | X | C |
| #4-2 | image_d_2 | #4 | 2 | 2 | C | A | Y | A |
| #4-3 | image_d_3 | #4 | 2 | 2 | C | B | Y | B |
| #4-4 | image_d_4 | #4 | 2 | 2 | C | C | X | C |

LIST OF CANDIDATES OF IMAGES WHOSE
LABELS NEED TO BE MODIFIED

ORIGINAL LABEL B →
- ○ A
- ○ B
- ○ C
- ● D (NOT APPLICABLE)

ORIGINAL LABEL C →
- ● A
- ○ B
- ○ C
- ○ D (NOT APPLICABLE)

ORIGINAL LABEL C →
- ○ A
- ● B
- ○ C
- ○ D (NOT APPLICABLE)

| MODEL ID 801 | CREATION DATE 802 | FILE NAME 803 | TRAINING DATA SET 804 | DIVISION NUMBER 805 | IDENTIFICATION ACCURACY 806 |
|---|---|---|---|---|---|
| #1 | YYYY/MM/DD | FIRST IDENTIFICATION MODEL | FIRST TRAINING DATA SET | 1 × 1 | AAA |
| #2 | YYYY/MM/DD | TENTATIVE SECOND IDENTIFICATION MODEL | TENTATIVE SECOND TRAINING DATA SET | 2 × 2 | — |
| #3 | YYYY/MM/DD | SECOND IDENTIFICATION MODEL | SECOND TRAINING DATA SET | 2 × 2 | BBB |
| #4 | YYYY/MM/DD | TENTATIVE THIRD IDENTIFICATION MODEL | TENTATIVE THIRD TRAINING DATA SET | 4 × 4 | — |
| #5 | YYYY/MM/DD | THIRD IDENTIFICATION MODEL | THIRD TRAINING DATA SET | 4 × 4 | CCC |
| #6 | YYYY/MM/DD | TENTATIVE FOURTH IDENTIFICATION MODEL | TENTATIVE FOURTH TRAINING DATA SET | 8 × 8 | — |
| #7 | YYYY/MM/DD | FOURTH IDENTIFICATION MODEL | FOURTH TRAINING DATA SET | 8 × 8 | DDD |
| #8 | YYYY/MM/DD | TENTATIVE FIFTH IDENTIFICATION MODEL | TENTATIVE FIFTH TRAINING DATA SET | 16 × 16 | — |
| #9 | YYYY/MM/DD | FIFTH IDENTIFICATION MODEL | FIFTH TRAINING DATA SET | 16 × 16 | EEE |

420

IMAGE IDENTIFICATION SYSTEM AND IMAGE IDENTIFICATION METHOD FOR IDENTIFYING IMAGES BASED ON DIVIDED TRAINING IMAGES

CROSS-REFERENCE TO RELATED APPLICATION

This application claims priority to Japanese Patent Application No. 2021-123914 filed on Jul. 29, 2021, the entire contents of which are incorporated by reference herein.

BACKGROUND OF THE INVENTION

The present invention relates to an image identification system and an image identification method.

Identification of micro-compositions of materials or material structures from images photographed with microscopes is performed in the development or quality management of high-performance materials. Conventionally, it is a common practice that humans visually perform such identification. Along with rapid evolution of image recognition technology using artificial intelligence (AI) technology in recent years, it is expected to perform such identification automatically from micrographic images using a model built beforehand by a machine learning method. This makes it possible to perform homogenous identification at low cost, eliminating variation in recognition by humans.

However, in order that such an image identification model derived from machine learning may classify material structures of photographed materials efficiently and accurately, the image identification model has to perform learning with a lot of applicable training data. In order to prepare training data required to meet both quality and quantity requirements, there is a need for experts with high skill; it is desirable to minimize man-hours.

Japanese Unexamined Patent Application Publication No. 2020-160543 discloses a technology that divides micrographic images and expands a training data database to build a large quantity of training data from a small quantity of micrographic images. Dividing micrographic images poses a possibility that a divided image displays a structure that appears different from a structure in an original micrographic image and is liable to be confused with another structure. Therefore, the following are performed: calculating the feature quantities of divided images, comparing the feature quantities with a threshold, and deleting a divided image whose feature quantity does not fulfill the threshold from training data.

As an exemplary embodiment of the present invention, a system is disclosed herein that infers micro-compositions of materials or material structures from textures being displayed in micrographic images. Meanwhile, in the field of remote sensing, inference on usage and environments of ground surfaces from textures being displayed in satellite images is performed. Texture indexes for use in texture analysis of satellite images are disclosed in Jingjing Zhou et. al., "The Effects of GLCM parameters on LAI estimation using texture values from Quickbird Satellite Imagery" Scientific Reports volume 7, Article number: 7366 (2017).

SUMMARY OF THE INVENTION

In Japanese Unexamined Patent Application Publication No. 2020-160543, chromaticity, brightness, contrast, structure pattern, frequency, amount of information (entropy), etc. are mentioned as examples of the feature quantities of images for making a decision as to whether or not divided images are applicable as teaching data, a feature quantity is selected according to the purpose of a model, and the thresholds of the feature quantities for making the above decision are predefined. Observers who have preliminary knowledge about the features of micrographic images as targets of observation are considered able to select an appropriate feature quantity and its threshold. However, it is desirable to make an appropriate decision as to whether or not divided images are applicable as teaching data even without such preliminary knowledge.

An image identification system which is one aspect of embodiment of the present invention includes a model building unit which builds an image identification model that performs identification on images as targets of identification processing and a training data creating unit which divides training images of a first training data set including the training images combined with labels assigned to the training images, assigns labels to the divided training images, and creates a second training data set including the divided training images combined with the labels assigned to the divided training images.

The model building unit includes a learning unit which builds an image identification model using the first training data set or the second training data set.

The training data creating unit includes an image dividing unit which divides the training images of the first training data set and assigns a label assigned to a training image from which dividing occurs to the divided training images as tentative labels, a texture index computing unit which computes texture indexes for each of the divided training images, a tentative label prediction model building unit which builds a tentative label prediction model to predict tentative labels assigned to the divided training images based on the texture indexes, a label comparison unit which compares first tentative labels assigned to the divided training images with second tentative labels predicted with respect to the divided training images by the tentative label prediction model and extracts divided training images for which there is discrepancy between the first tentative labels and the second tentative labels as divided training images for which it is highly necessary to modify tentative labels, and a label modification unit which modifies labels that are assigned to divided training images extracted as the divided training images for which it is highly necessary to modify the tentative labels.

The present invention enables it to build an image identification model having high accuracy of identification using divided training images which training images are divided. Other problems and novel features will become apparent from the description in the present specification and the attached drawings.

DETAILED DESCRIPTION OF THE PREFERRED EMBODIMENTS

Figure 8:
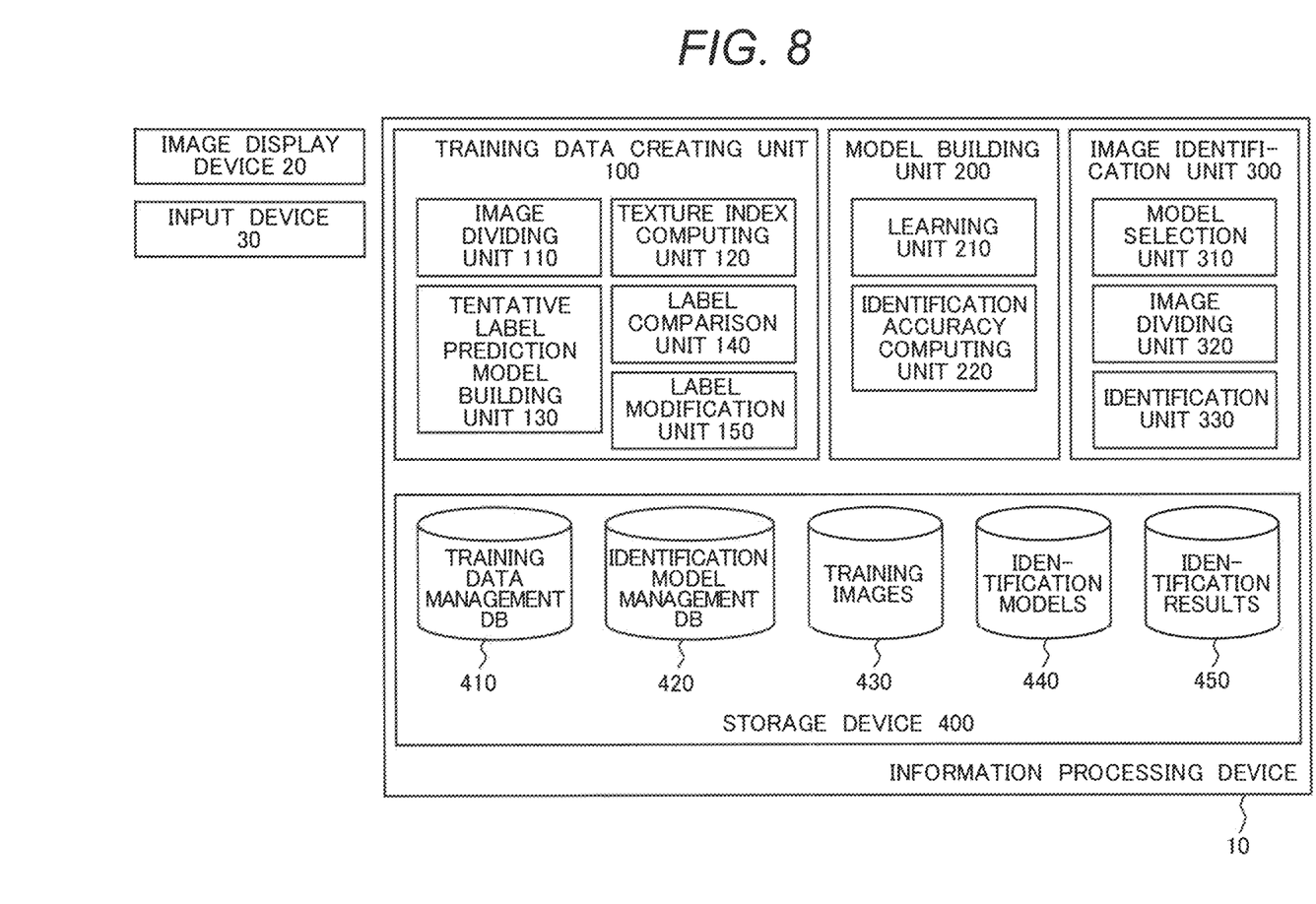
FIG. 8 is a functional block diagram of a micrographic image texture analysis system.

FIG. 8 depicts a functional block diagram of a micrographic image texture analysis system of an embodiment of the present invention. The micrographic image texture analysis system includes an information processing device 10 such as a PC and a server, an image display device 20, and an input device 30 as main components. The information processing device 10 is equipped with a processing device (processor) and a storage device.

Functionality of the micrographic image texture analysis system is implemented through execution of programs stored in the storage device of the information processing device 10 by the processing device (processor). As for a physical configuration of the information processing device 10, the information processing device may be configured by a single PC or server or a plurality of servers; in the latter case, any part of the processing device and the storage device is connected through a network. In addition, functionality equivalent to all or part of software configured functionality may be implemented by hardware such as FPGA (Field Programmable Gate Array) and ASIC (Application Specific Integrated Circuit).

FIG. 8 is represented as the functional block diagram focusing on functional features that are implemented by the micrographic image texture analysis system. Details on each function will be described later.

The storage device 400 is a nonvolatile memory like HDD (Hard Disk Drive) or SSD (Solid State Drive) and data necessary for processing by the system and data resulting from the processing are stored therein. Details on these data will be described later.

The information processing device 10 is connected with the image display device 20 and the input device 30 such as a key board and a pointing device. The user inputs a user command to a GUI (Graphical User Interface) displayed on the image display device 20 through the use of the input device 30.

Figure 1:
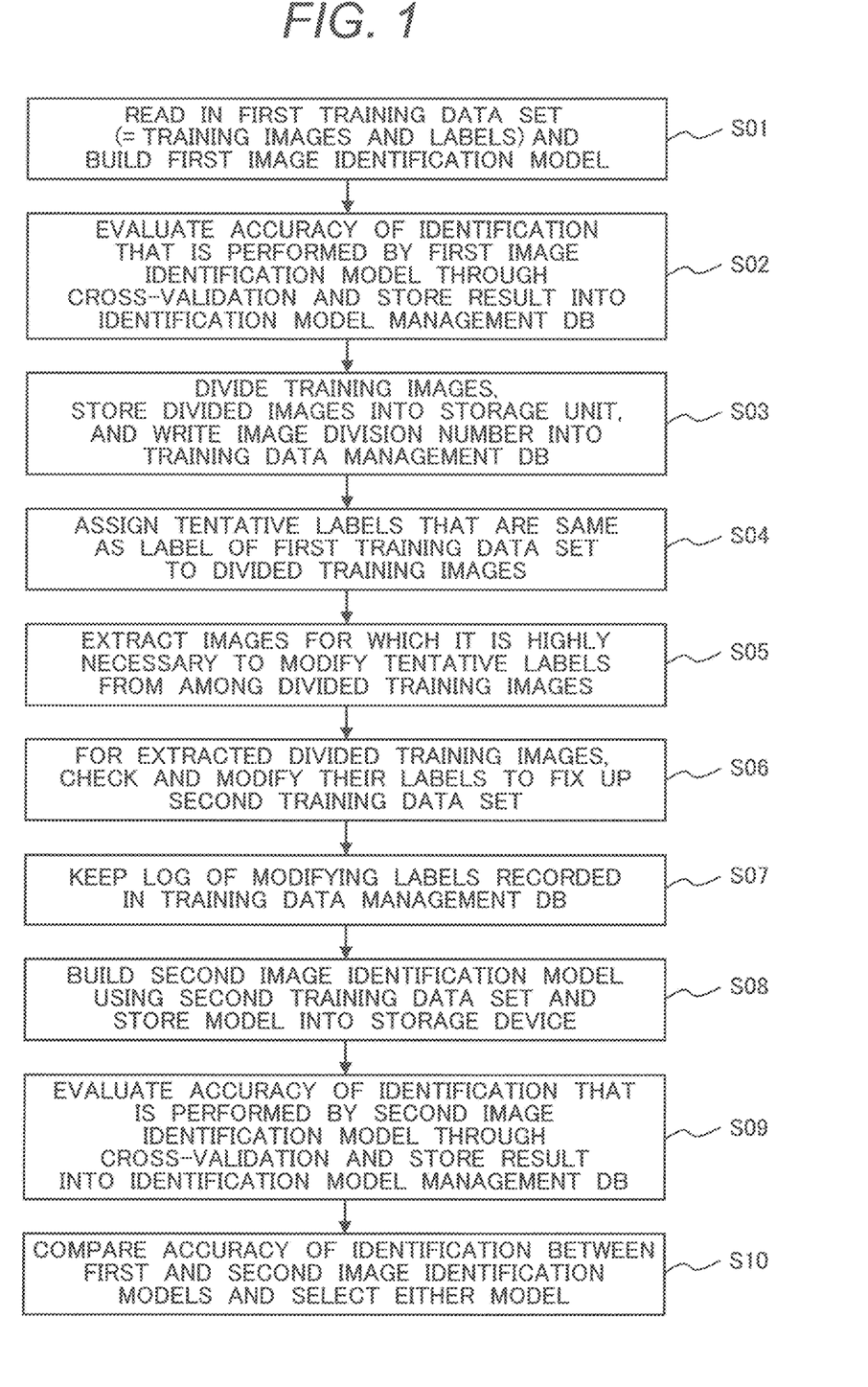
FIG. 1 is a flowchart for building an image identification model.

FIG. 1 illustrates a flowchart in which the micrographic image texture analysis system builds an image identification model. Processing through this flowchart is to build an image identification model (a second image identification model) that has performed learning with new training images that are divided images into which training images are divided. Image identification models use a known method such as CNN (Convolutional Neural Network). Here, if a training image to be divided is an image representing an overall uniform texture, labels that are assigned to divided images may be considered as the same as the label of the original training image. In some cases, however, a training image may be a non-uniform image in which multiple textures are mixed. In this case, classification of training images is performed according to a texture that occupies the majority, a texture that exhibits a feature, or a combination of textures that exhibits a feature. Divided images into which such a training image is divided do not necessarily have a feature that the original training image has as a whole. Therefore, if an image identification model is built with training data in which divided images are automatically assigned the same label as of the original training image, there may be a decrease in the accuracy of identification performed by the image identification model on the contrary. An embodiment of the present invention enables creation of a set of training images based on divided images of high quality, reducing the user's burdens for classification of divided training images.

First, a model building unit 200 builds an image identification model using a first training data set that is a set of original training images. A learning unit 210 refers to a training data management database 410, reads in training images of the first training data set from a training image storage unit 430, and builds a first image identification model (S01).

Figure 3A:
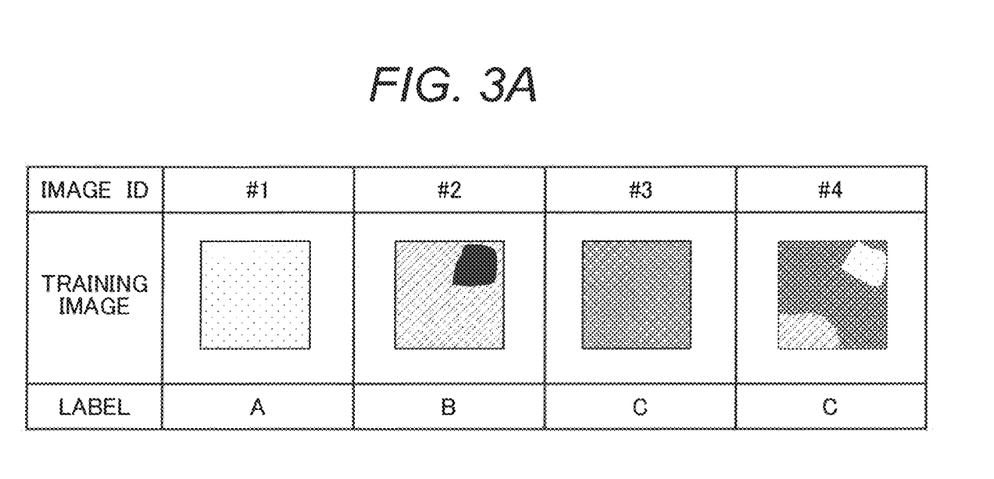
FIG. 3A is an example of a first training data set.
Figure 9A:
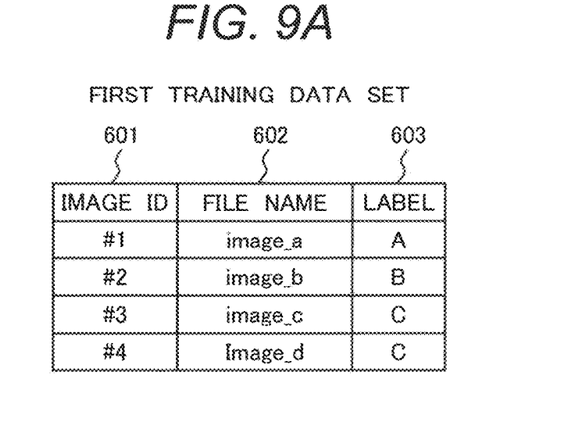
FIG. 9A is an example of management data of a first training data set.

A set that includes training images combined with labels assigned to the training images is referred to as a training data set. FIG. 9A represents an example of data that is managed as the first training data set which is registered in the training data management database 410. In the database 410, for training images that constitute the first training data set, their image IDs 601, file names 602, and labels 603 are registered. An image ID 601 is an ID that uniquely identifies a training image. A file name 602 is the file name of a training image stored in the training image storage unit 430. A label 603 is the label assigned to a training image. FIG. 3A represents an example of the first training data set as presented in FIG. 9A.

Figure 12:
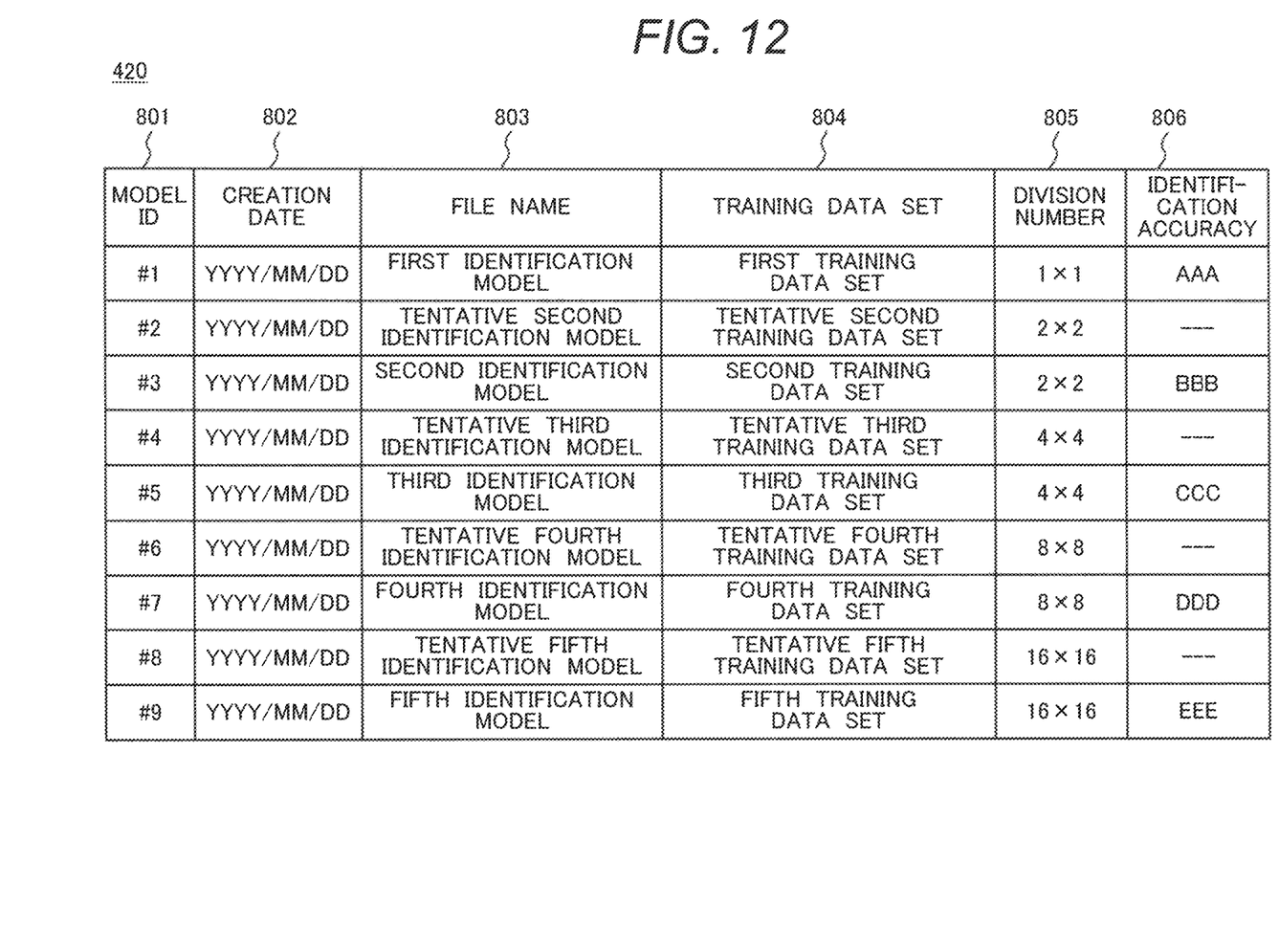
FIG. 12 is an example of a data structure of an identification model management database.

Next, an identification accuracy computing unit 220 evaluates accuracy of identification that is performed by the first image identification model through cross-validation and stores a result into an identification model management database 420 (S02). FIG. 12 represents an example of a data structure of the identification model management database 420. The database 420 includes the following columns; model ID 801, creation date 802, file name 803, training data set 804, division number 805, and identification accuracy 806. A model ID 801 is an ID that uniquely identifies a record in the database 420. Creation date 802 is the date when a record is created. A file name 803 is the file name of an image identification model stored in an identification model storage unit 440. A training data set 804 is the training data set used to build the image identification model. A division number 805 is the number of images into which an original training image is divided. Identification accuracy 806 is the accuracy of identification that is performed by the image identification model, obtained through cross-validation.

A model ID "#1" in FIG. 12 is a record of the first image identification model. Because the first image identification model is a model built with the first training data set in which original training images are intact, its division number 805 is set as "1×1". The accuracy of identification that is performed by the first image identification model, obtained at step S02, is stored in the column 806.

Figure 9B:
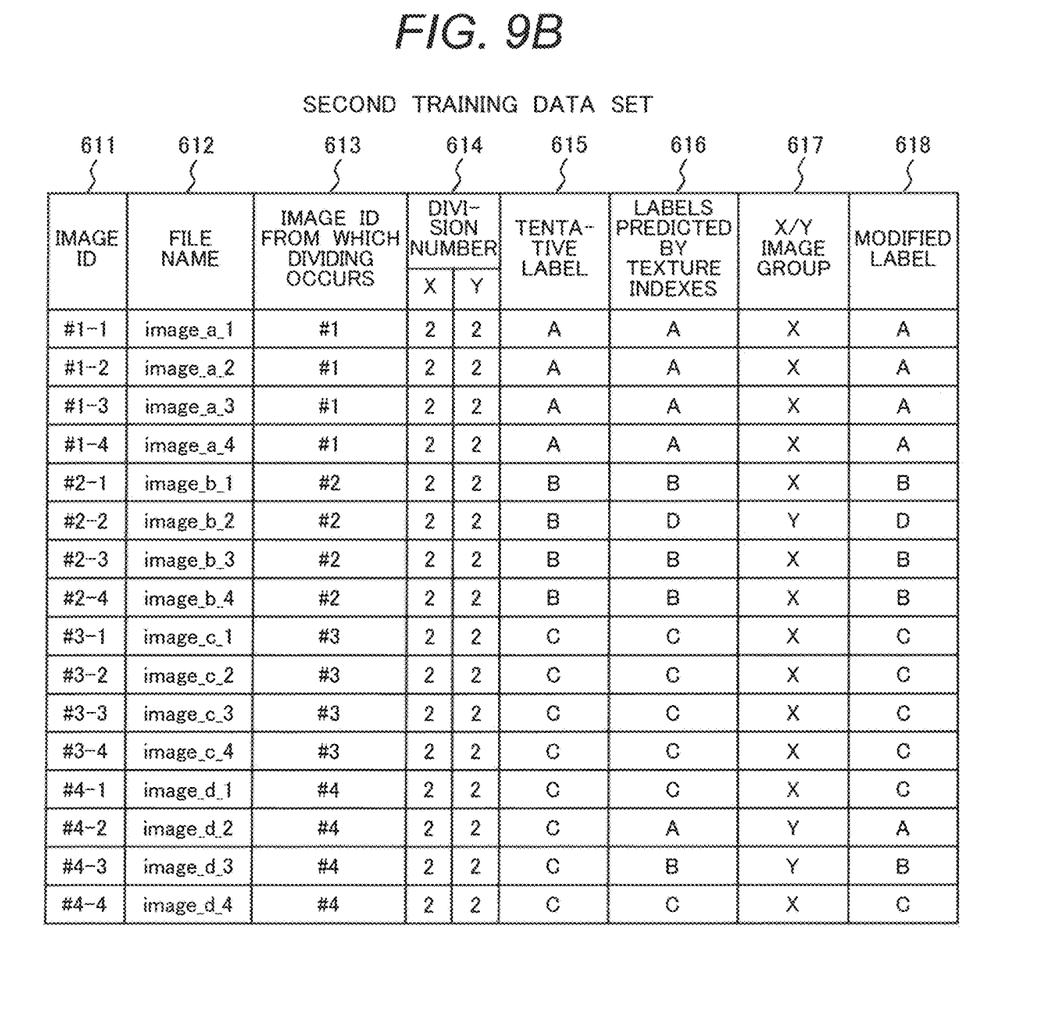
FIG. 9B is an example of management data of a second training data set.

Subsequently, a description is provided about a process of creating a new training data set by dividing original training images. In the following, this process is described with reference to an example in which the training images that constitute the first training data set (FIG. 3A) are each divided into two equal parts in vertical and horizontal directions "2×2" to create a second training data set. FIG. 9B represents an example of data that is managed as the second training data set that is registered by this process into the training data management database 410. For training images that constitute the second training data set created by this process, their image IDs 611, file names 612, image IDs 613 from which dividing occurs, division number 614, tentative labels 615, predicted labels 616, X/Y image groups 617, and modified labels 618 are registered.

Figure 3B:
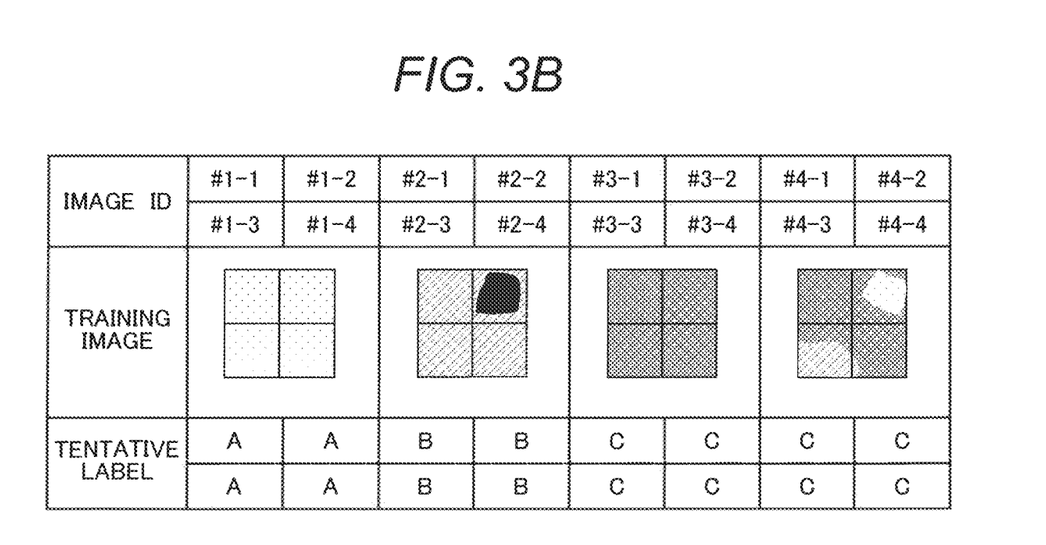
FIG. 3B is an example of a second training data set (assigning tentative labels)

First, an image dividing unit 110 divides training images, stores the divided images into the training image storage unit 430, writes number of the division of the image into the training data management database 410 (S03), and assigns tentative labels that are the same as the label of the first training data set to the divided training images (S04). At this stage, data is registered in the columns 611 to 615 of the management data as presented in FIG. 9B. FIG. 3B represents the second training data set at the stage of termination of step S04. As is evident by comparison between FIG. 3A and FIG. 3B, the divided training images are assigned the labels of the training images from which they are divided as their tentative labels.

In FIG. 9B, an image ID 611 is the ID that uniquely identifies a divided training image; here, a divided training image is identified by assigning a branch number to the image ID 613 from which dividing occurs. A file name 612 is the file name of a divided training image stored in the training image storage unit 430. A division number 614 denotes the number of images derived from the image from which dividing occurs. In the field of tentative label 615, a label assigned to the image from which dividing occurs is automatically assigned to divided training images.

Figure 4:
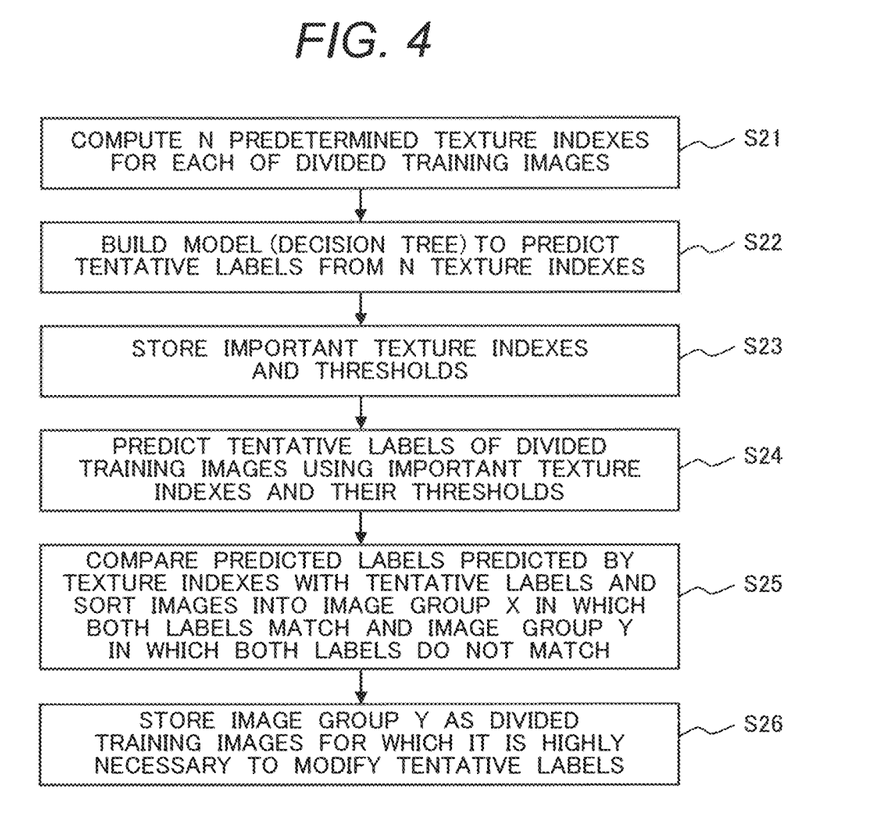
FIG. 4 is a flowchart for extracting divided training images for which it is highly necessary to modify tentative labels.

Subsequently, images for which it is highly necessary to modify tentative labels are extracted from among the divided training images (S05). For this purpose, the following are performed: extracting image texture indexes; building an analysis model based on the image texture indexes; and comparing labels predicted by the analysis model with tentative labels. Thereby, tentative labels that are very likely to have to be modified are extracted. Details of step S05 are illustrated in FIG. 4.

A texture index computing unit 120 computes N predetermined texture indexes for each of the divided training images (S21). Texture indexes are those obtained by indexing the texture of an image. For example, texture indexes such as brightness, frequency, uniformity, local uniformity, contrast, entropy, non-uniformity, edge strength, strength of light-dark change, correlation, or a linear combination of these items are conceivable. All these items are exemplary and texture indexes other than these items may be used.

Figure 5A:
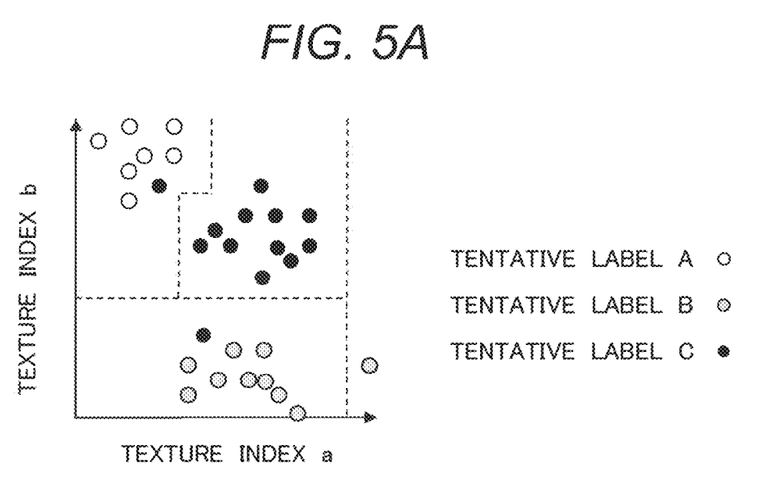
FIG. 5A is an example of distribution of nodes in a space of important texture indexed.

A tentative label prediction model building unit 130 selects texture indexes that are highly correlated with tentative labels from the N texture indexes, builds a model (a decision tree) to predict tentative labels (S22), and stores the texture indexes that are used for the model (decision tree) (which are referred to as important texture indexes) and thresholds (S23). FIG. 5A illustrates an example of distribution of nodes in the space of important texture indexes. Respective nodes correspond to divided training images and are color coded by assigned tentative label in the illustration. In order to make tentative labels as identical as possible which are assigned to nodes distributed within each of regions defined by thresholds which are denoted by dashed lines in the texture index space, in building a model (a decision tree), a selection should be made of texture indexes that are highly correlated with tentative labels as the texture indexes for use in building the model and thresholds that regionalize the space should be selected appropriately in order to avoid as much coexistence as possible of nodes having different tentative labels in a region. Although an example of the space of important texture indexes is presented here, the space being defined by two texture indexes which are easy to illustrate, a model may be based on a space of important texture indexes, the space being defined by more than two indexes.

Figure 5B:
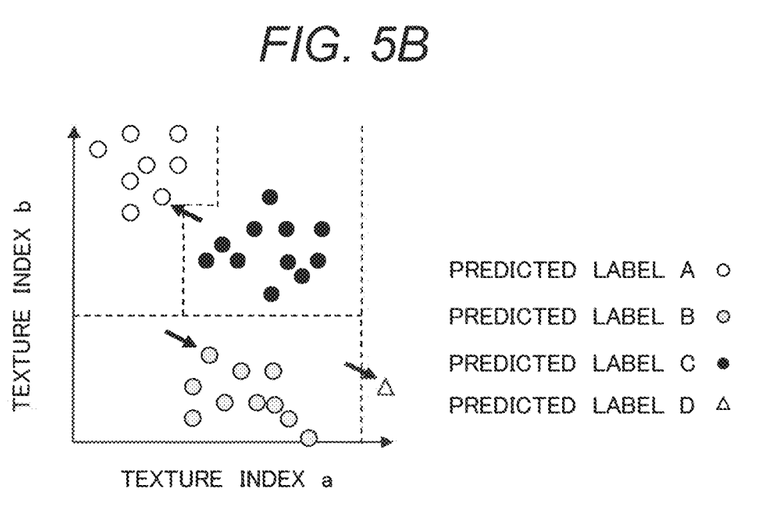
FIG. 5B is distribution of predicted labels predicted using a model (decision tree)

A prediction is made of the labels of the divided training images using the model (decision tree) created at step S22 (S24). Tentative labels predicted by using the model are referred to as predicted labels. FIG. 5B illustrates distribution of predicted labels predicted by using the model (decision tree) in FIG. 5A. FIG. 5A and FIG. 5B exhibit a similar distribution of nodes, but predicted labels presented in FIG. 5B are identical for nodes being distributed within each of regions defined by thresholds which are denoted by dashed lines, which differs from the tentative labels in FIG. 5A.

A label comparison unit 140 compares the predicted labels predicted by the texture indexes with the tentative labels, sorts an image in which both labels match into an image group X, and sorts an image in which both labels do not match into an image group Y (S25). This unit registers the image group Y as training images for which it is highly necessary to modify tentative labels into the training data management database 410 (S26). In the example of FIG. 5B, divided training images corresponding to nodes marked by arrow are sorted into the image group Y and divided training images corresponding to other nodes are sorted into the image group X.

At the stage of termination of step S05, data is registered into the columns 616 to 617 of the management data presented in FIG. 9B. Predicted labels predicted at step S24 are registered in the field of predicted label 616 and image group designators into which the divided training images are sorted at step S25 are registered in the field of X/Y image group 617. In this way, by executing a process of selecting texture indexes that well reproduce tentative labels without fixing texture indexes, it becomes possible to appropriately extract divided training images for which it is highly necessary to modify tentative labels even for any sort of micrographic images.

For the divided training images extracted as those for which it is highly necessary to modify tentative labels in the step S05 (see FIG. 1) described above, a label modification unit 150 checks and modifies their labels to fix up the second training data set (S06). Label modification may be performed automatically using an appropriate image identification model or the user may modify labels discretely using the GUI. These ways of modification are described separately.

Figure 3C:
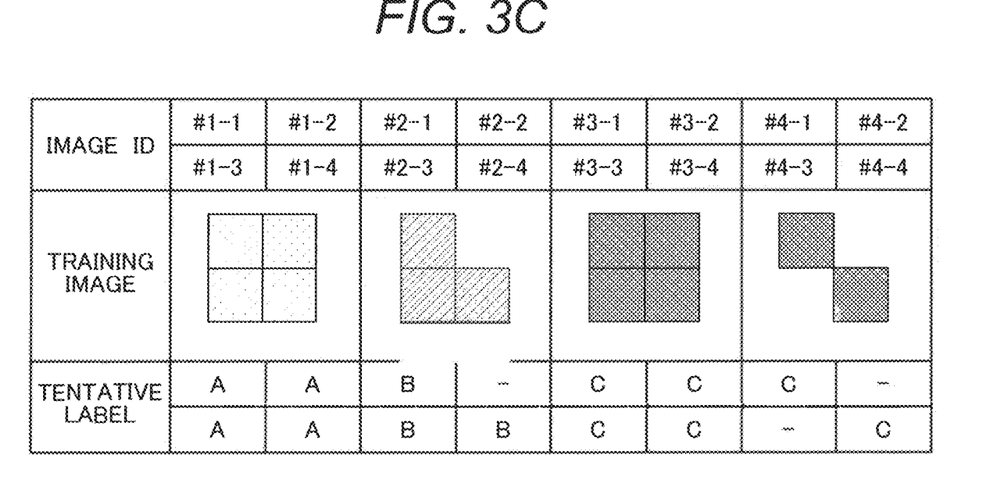
FIG. 3C is an example of a tentative second training data set.
Figure 6:
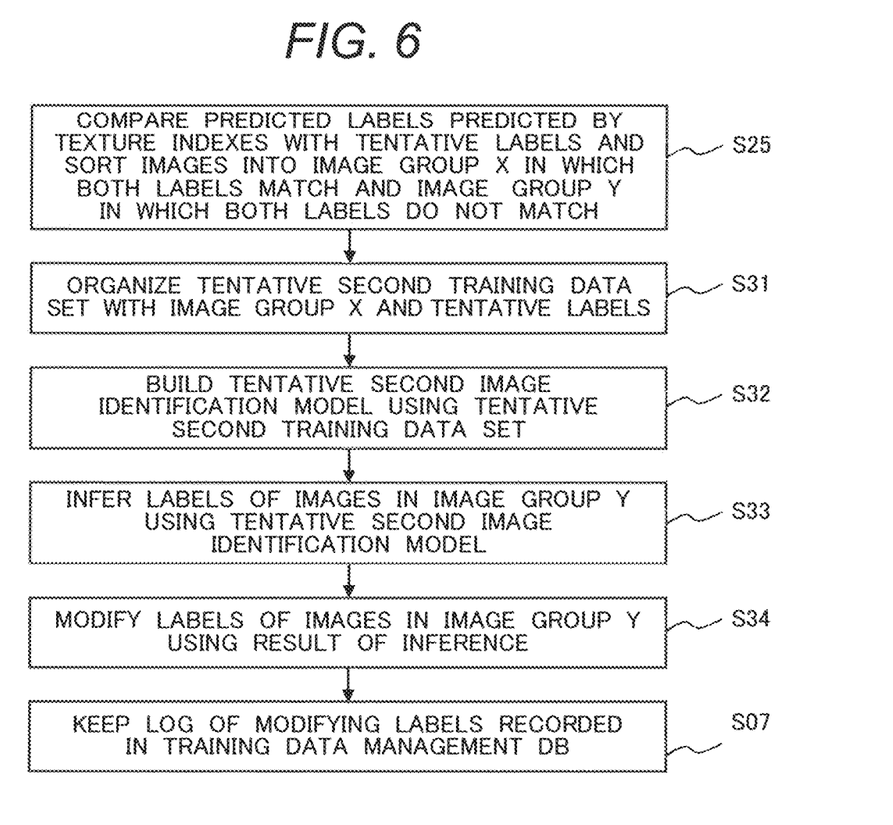
FIG. 6 is a flowchart for modifying tentative labels using an image identification model.

FIG. 6 is a flowchart for modifying tentative labels using an appropriate model. Based on the result of sorting at step S25, a tentative second training data set is organized with the images in the image group X combined with tentative labels (S31). FIG. 3C represents a tentative second training data set. The learning unit 210 in the model building unit 200 builds a tentative second image identification model using the tentative second training data set (S32). An identification unit 330 in an image identification unit 300 infers the labels to be assigned to the divided training images in the image group Y using the tentative second image identification model (S33). The labels inferred with the tentative second image identification model are set as the modified labels of the divided training images in the image group Y (S34).

Figure 7:
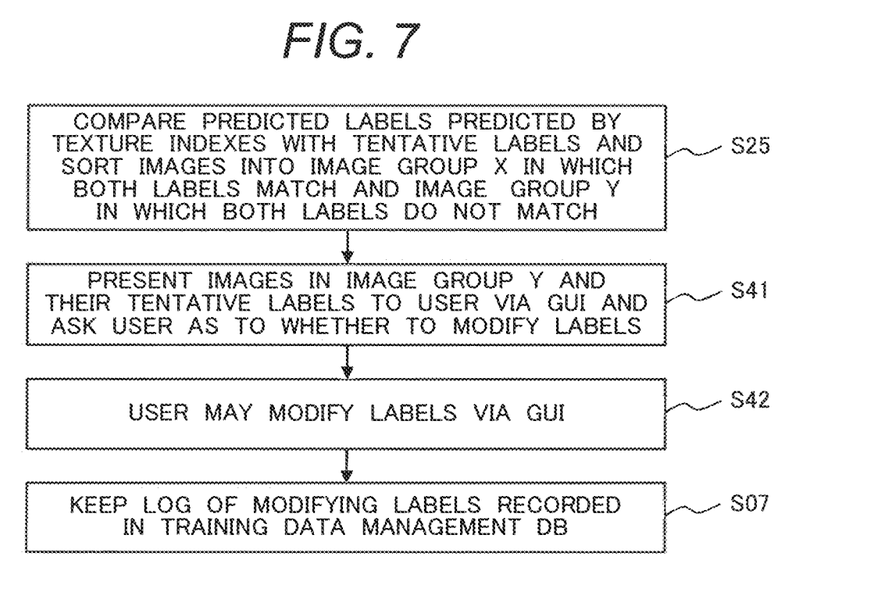
FIG. 7 is a flowchart by which a user modifies labels discretely.
Figure 10:
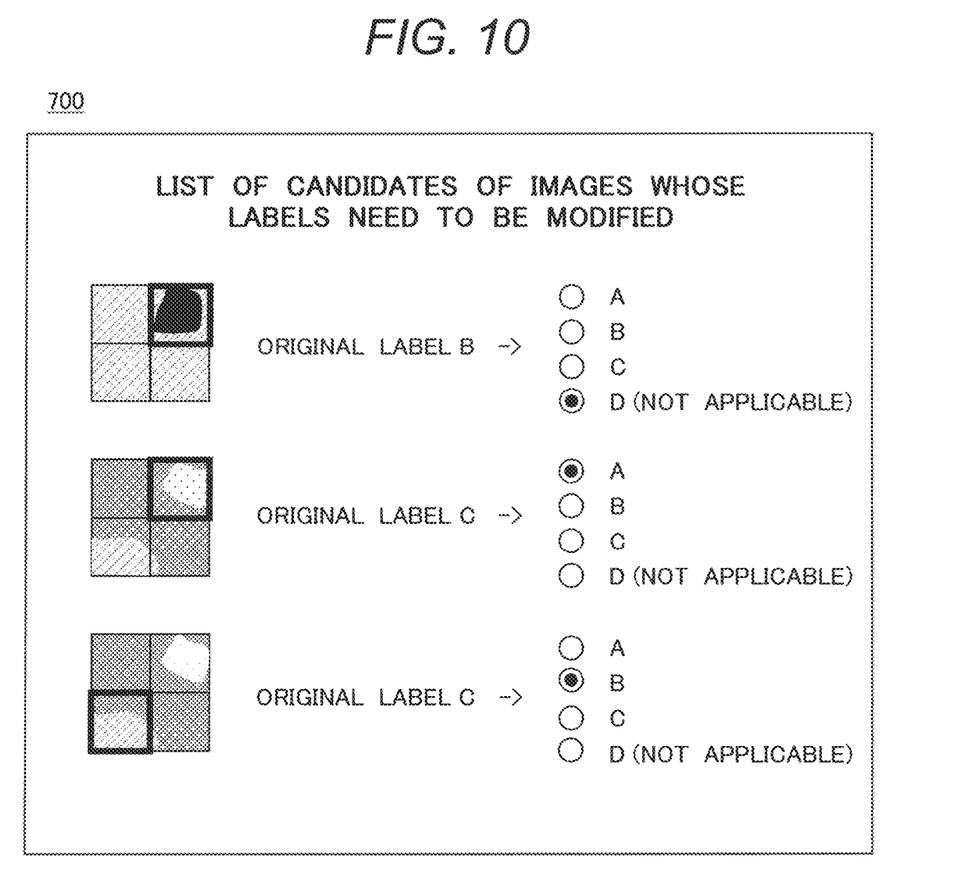
FIG. 10 is an example of a GUI screen.

FIG. 7 is a flowchart by which the user will modify labels discretely using the GUI. The divided training images sorted into the image group Y at step S25 and their tentative labels are presented to the user via the GUI and the user is asked as to whether to modify the labels (S41). FIG. 10 illustrates an example of a GUI screen. The user may modify a label by visually checking the divided training images displayed in the GUI screen 700 and choosing an appropriate label (S42).

Figure 3D:
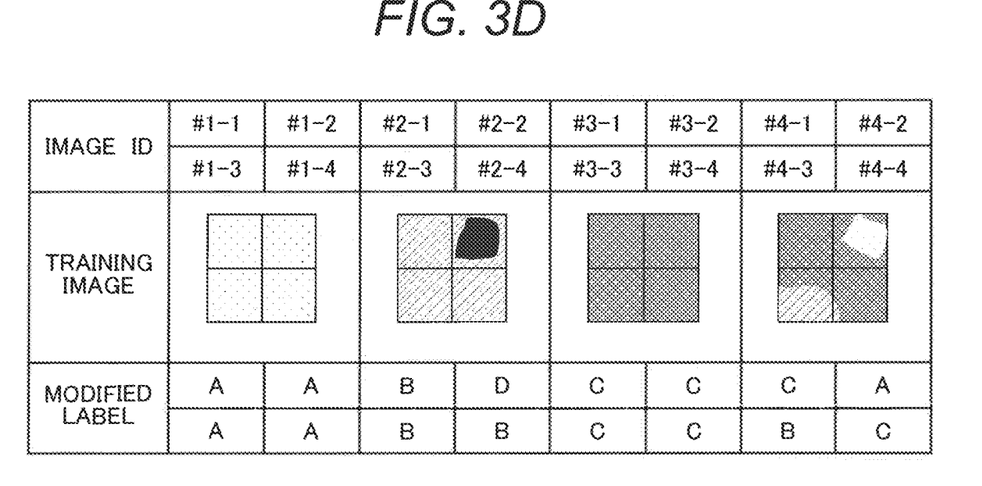
FIG. 3D is an example of a second training data set (assigning modified labels)

FIG. 3D represents the second training data set in which the labels of the divided training images in the image group Y are modified. When labels that are assigned to the divided training images in the image group Y are modified in either way of modification, the labels assigned to the respective divided training images are registered in the column 618 (modified label 618) of the management data presented in FIG. 9B (S07). In this way, the training data management database 410 keeps log data recorded until the labels that are assigned to the divided training images of the second training data set are finally determined. The log data can be used to seek for a cause of malfunction, if occurs, for example, there is no improvement in the accuracy of identification that is performed with the second image identification model that is built using the second training data set.

Using the second training data set created in this way, the learning unit 210 in the model building unit 200 builds the second image identification model (S08). The identification accuracy computing unit 220 evaluates accuracy of identification that is performed by the second image identification model through cross-validation and stores a result into the identification model management database 420 (S09). Because processing here is the same as the steps S01 and S02, duplicated description is omitted.

Subsequently, a model selection unit 310 in the image identification unit 300 compares accuracy of identification between the first and second image identification models and selects the image identification model that produces higher accuracy of identification as the image identification model that performs identification on unknown images (images as targets of identification processing) (S10).

Figure 2:
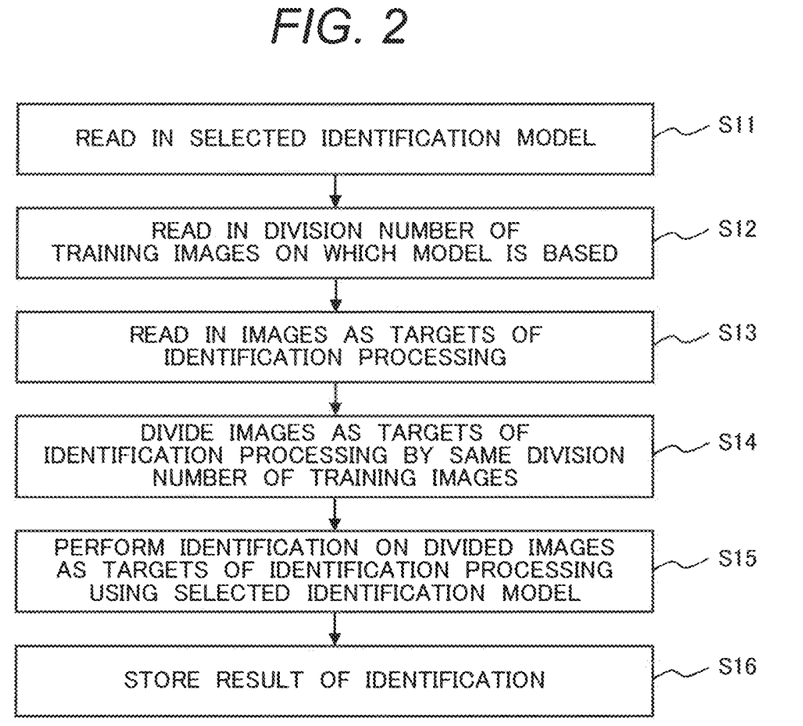
FIG. 2 is a flowchart by which identification is performed on unknown images (images as targets of identification processing)

FIG. 2 illustrates a flowchart by which identification is performed on images as targets of identification processing using the image identification model selected at step S10. This flowchart is executed by the image identification unit 300.

First, the identification unit 330 reads out the image identification model selected by the model selection unit 310 from the identification model storage unit 440 (S11).

In the meantime, an image dividing unit 320 refers to the identification model management database 420 and reads in the division number 805 for the training data set used to build the image identification model selected by the model selection unit 310 (S12). Subsequently, this unit reads in images as targets of identification processing (S13) and divides these images by the division number that it has read in at step S12 (S14). For example, if the second identification model is selected at step S10, the identification unit 330 performs identification on images as targets of identification processing divided by 2×2 (S15) and stores a result of the identification into an identification result storage unit 450 (S16).

Figure 11:
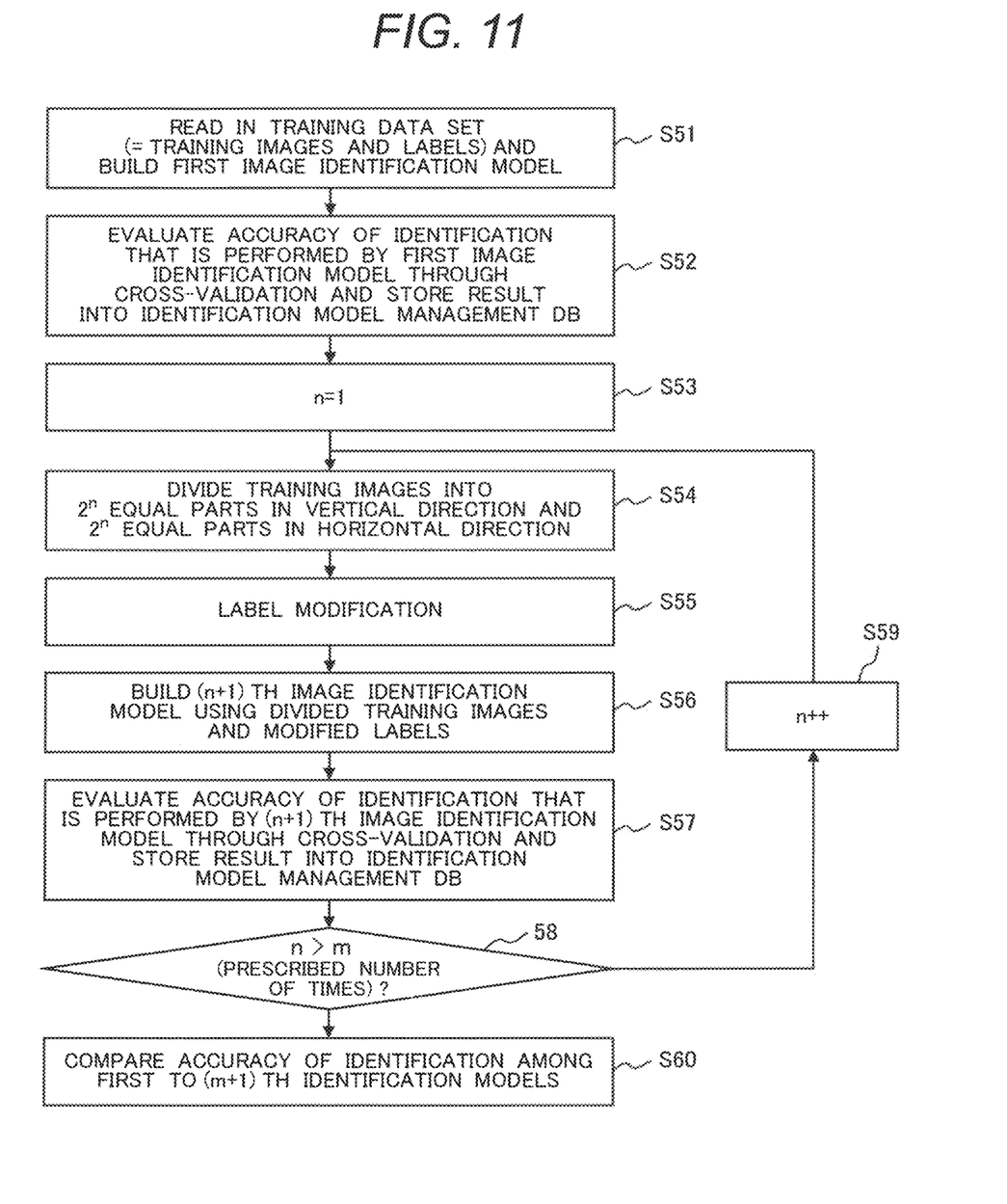
FIG. 11 is a flowchart for selecting an optimal division number of dividing training images.

Although an example in which the division number of training images is set to 2×2 has been explained in the foregoing description, the division number is not so limited. It is allowed to try multiple ways of dividing images and select an optimal image identification model. A flowchart hereof is illustrated in FIG. 11. In FIG. 11, training images are each divided into $2^n$ equal parts vertically and horizontally. With thus divided training images, training data sets numbered n+1 are created. n is increased from 1 by 1 serially until n becomes equal to m (S58, S59). By iteration of steps S54 to S57, the following are performed: creating first to (m+1)th training data sets; building first to (m+1)th image identification models using these training data sets; and computing accuracy of identification that is performed by each of these models. If n=1, the processing of steps S51 to S57 is the same as S01 to S09 in the flowchart of FIG. 1. The flowchart of FIG. 11 iterates the same processing, while changing the division number of training images and therefore, duplicated description is omitted. Information on identification modes that are built through this process is stored into the identification model management database 420, as presented in FIG. 12.

The model selection unit 310 in the image identification unit 300 compares accuracy of identification among the first to (m+1)th identification models, selects the image identification model that produces the highest accuracy of identification as the image identification model that performs identification on the images as targets of identification processing (S60).

The present invention has been described hereinbefore based on its exemplary embodiment and modification. The present invention is not limited to the foregoing exemplary embodiment and modification and can be modified in various ways without changing the scope and spirit of the invention.

REFERENCE SIGNS LIST

10: information processing device, 20: image display device, 30: input device, 100: training data creating unit, 110: image dividing unit, 120: texture index computing unit, 130: tentative label prediction model building unit, 140: label comparison unit, 150: label modification unit, 200: model building unit, 210: learning unit, 220: identification accuracy computing unit, 300: image identification unit, 310: model selection unit, 320: image dividing unit, 330: identification unit, 400: storage device, 410: training data management database, 420: identification model management database, 430: training image storage unit, 440: identification model storage unit, 450: identification result storage unit, 601: image ID, 602: file name, 603: label, 611: image ID, 612: file name, 613: image ID from which dividing occurs, 614: division number, 615: tentative label, 616: predicted label, 617: X/Y image group, 618: modified label, 700: GUI screen, 801: model ID, 802: creation date, 803: file name, 804: training data set. 805: division number, 806: identification accuracy.

What is claimed is:

1. An image identification system comprising:
a model building unit which builds an image identification model that performs identification on images as targets of identification processing; and a training data creating unit which divides training images of a first training data set, including the training images combined with a corresponding label assigned to each of the training images, assigns first tentative labels to the divided training images, and creates a second training data set including the divided training images combined with the first tentative labels, the model building unit including a learning unit which builds the image identification model using the first training data set or the second training data set, wherein the training data creating unit includes:

a first image dividing unit which divides the training images of the first training data set, wherein each of the training images is divided into a plurality of equal parts in vertical and horizontal directions, and assigns the corresponding label assigned to the training image from which dividing occurs to the divided training images as the first tentative labels;

a texture index computing unit which computes texture indexes for each of the divided training images;

a tentative label prediction model building unit which builds a tentative label prediction model to predict second tentative labels assigned to the divided training images based on the texture indexes;

a label comparison unit which compares the first tentative labels with the second tentative labels and extracts the divided training images for which there is discrepancy between the first tentative labels and the second tentative labels as divided training images for which it is necessary to modify the first tentative labels; and a label modification unit which modifies the first tentative labels that are assigned to the divided training images for which it is necessary to modify the first tentative labels; and an image identification unit which performs identification on the images as targets of identification processing using the image identification model, wherein the model building unit includes an identification accuracy computing unit which computes accuracy of identification with respect to each of a first image identification model trained by using the first training data set and a second image identification model trained by using the second training data set, and wherein the image identification unit includes:

a model selection unit which compares accuracy of identification between the first image identification model and the second image identification model and selects either the first image identification model or the second image identification model as the image identification model that is used to perform identification on the images as targets of identification processing, based on a determination of which of the first image identification model and the second image identification model produces a higher accuracy of identification;

a second image dividing unit which divides the images as targets of identification processing by division number of training images for the image identification model selected by the model selection unit and creates divided images as targets of identification processing; and an identification unit which performs identification on the divided images as targets of identification processing using the image identification model selected by the model selection unit.

2. The image identification system according to claim 1, comprising a training data management database to store management data of training data sets, wherein the management data of the second training data set includes log data that keeps track of a process in which the training data creating unit has created the second training data set.

3. The image identification system according to claim 1, wherein the texture index computing unit computes a plurality of predetermined texture indexes for each of the divided training images; and wherein the tentative label prediction model building unit selects important texture indexes that are correlated with the second tentative labels from the plurality of predetermined texture indexes and builds the tentative label prediction model based on the selected important texture indexes.

4. The image identification system according to claim 3, wherein the texture indexes include any of the following: brightness, frequency, uniformity, local uniformity, contrast, entropy, non-uniformity, edge strength, strength of light-dark change, correlation, or a linear combination of these items.

5. The image identification system according to claim 1, wherein the label modification unit modifies the first tentative labels that are assigned to the divided training images for which it is necessary to modify the first tentative labels by using a tentative second image identification model that the model building unit has built using a tentative second training data set including divided training images for which there is equality between the first tentative labels and the second tentative labels and which are combined with the first tentative labels and causing the tentative second image identification model to identify the divided training images for which it is necessary to modify the first tentative labels.

6. The image identification system according to claim 1, wherein the label modification unit displays divided training images for which it is necessary to modify the first tentative labels on an image display device and prompts selection of a modified label to assign to the divided training images for which it is necessary to modify the first tentative labels.

7. The image identification system according to claim 1, wherein the training data creating unit creates a plurality of the second training data sets in which training images are divided by different division numbers; and the model selection unit in the image identification unit compares accuracy of identification between the first image identification model and a plurality of the second image identification models built based on the plurality of second training data sets respectively and selects the first image identification model or one of the plurality of the second image identification models as the image identification model that is used to perform identification on the images as targets of identification processing, based on a determination of which of the first image identification model and the plurality of the second image identification models produces a highest accuracy of identification.

8. The image identification system according to claim 1, wherein the images as targets of identification processing are micrographic images.

9. An image identification method using an image identification system including a model building unit which builds an image identification model that performs identification on images as targets of identification processing and a training data creating unit which divides training images of a first training data set, including the training images combined with a corresponding label assigned to each of the training images, assigns first tentative labels to the divided training images, and creates a second training data set including the divided training images combined with the first tentative labels, wherein the training data creating unit performs the following:

dividing the training images of the first training data set, wherein each of the training images is divided into a plurality of equal parts in vertical and horizontal directions, and assigning the corresponding label assigned to the training image from which dividing occurs to the divided training images as the first tentative labels;

computing texture indexes for each of the divided training images;

building a tentative label prediction model to predict second tentative labels assigned to the divided training images based on the texture indexes;

comparing the first tentative labels with the second tentative labels and extracting the divided training images for which there is discrepancy between the first tentative labels and the second tentative labels as divided training images for which it is necessary to modify the first tentative labels; and modifying the first tentative labels that are assigned to the divided training images for which it is necessary to modify the first tentative labels, and wherein the model building unit trains a first image identification model and a second image identification model using the first training data set and the second training data set, respectively, wherein the image identification system further includes an image identification unit which performs identification on the images as targets of identification processing using the image identification model, wherein the image identification unit performs the following:

comparing accuracy of identification between the first image identification model and the second image identification model and selecting either the first image identification model or the second image identification model as the image identification model that is used to perform identification on the images as targets of identification processing, based on a determination of which of the first image identification model and the second image identification model produces a higher accuracy of identification;

dividing the images as targets of identification processing by division number of training images for the selected image identification model and creating divided images as targets of identification processing; and performing identification on the divided images as targets of identification processing using the selected image identification model.

10. The image identification method according to claim 9, wherein the training data creating unit computes a plurality of predetermined texture indexes for each of the divided training images, selects important texture indexes that are correlated with the second tentative labels from the plurality of predetermined texture indexes, and builds the tentative label prediction model based on the selected important texture indexes.

11. The image identification method according to claim 9, wherein the training data creating unit modifies the first tentative labels that are assigned to the divided training images for which it is necessary to modify the first tentative labels by using a tentative second image identification model which has been built using a tentative second training data set including divided training images for which there is equality between the first tentative labels and the second tentative labels and which are combined with the first tentative labels and causing the tentative second image identification model to identify the divided training images for which it is necessary to modify the first tentative labels.

12. The image identification method according to claim 9, wherein the training data creating unit displays divided training images for which it is necessary to modify the first tentative labels on an image display device and prompts selection of a modified label to assign to the divided training images for which it is necessary to modify the first tentative labels.

13. The image identification method according to claim 9, wherein the training data creating unit creates a plurality of the second training data sets in which training images are divided by different division numbers; and the image identification unit compares accuracy of identification between the first image identification model and a plurality of the second image identification models built based on the plurality of second training data sets respectively and selects the first image identification model or one of the plurality of the second image identification models as the image identification model that is used to perform identification on the images as targets of identification processing, based on a determination of which of the first image identification model and the plurality of the second image identification models produces a highest accuracy of identification.

* * * * *